United States Patent
Bottini et al.

(10) Patent No.: US 12,153,950 B2
(45) Date of Patent: Nov. 26, 2024

(54) TENANT SECURITY CONTROL OF DATA FOR APPLICATION SERVICES

(71) Applicant: Workday, Inc., Pleasanton, CA (US)

(72) Inventors: Emalee Ann Bottini, San Ramon, CA (US); Barbara Marie Cosgrove, San Francisco, CA (US); Mohan Rajagopalan, San Francisco, CA (US); Andrew Timothy Cannon, Dublin, CA (US); Merethe Eidnes Hansen, Dublin, CA (US); Olivia Yu Gu, San Francisco, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 18/300,712

(22) Filed: Apr. 14, 2023

(65) Prior Publication Data

US 2023/0251892 A1    Aug. 10, 2023

Related U.S. Application Data

(63) Continuation of application No. 16/253,052, filed on Jan. 21, 2019, now Pat. No. 11,782,749.

(51) Int. Cl.
| | |
|---|---|
| *G06F 9/455* | (2018.01) |
| *G06F 3/0482* | (2013.01) |
| *G06F 18/214* | (2023.01) |
| *G06F 21/62* | (2013.01) |
| *G06N 20/00* | (2019.01) |

(52) U.S. Cl.
CPC ........ *G06F 9/45558* (2013.01); *G06F 3/0482* (2013.01); *G06F 18/214* (2023.01); *G06F 21/6254* (2013.01); *G06N 20/00* (2019.01); *G06F 2009/45587* (2013.01)

(58) Field of Classification Search
CPC .............. G06F 9/45558; G06F 3/0482; G06F 21/6254; G06F 18/214; G06F 2009/45587; G06N 20/00; G06K 9/6256
USPC .......................................................... 726/1
See application file for complete search history.

(56) References Cited

U.S. PATENT DOCUMENTS

| | | | |
|---|---|---|---|
| 11,341,430 B2 * | 5/2022 | Potkalesky | G06F 21/602 |
| 11,606,365 B2 * | 3/2023 | Potkalesky | H04L 63/123 |
| 2016/0034713 A1 * | 2/2016 | Ramirez | H04L 63/0428 |
| | | | 713/168 |
| 2017/0243028 A1 | 8/2017 | Lafever | |
| 2018/0136960 A1 * | 5/2018 | Zhang | G06F 9/4856 |
| 2018/0181716 A1 * | 6/2018 | Mander | G16H 50/20 |
| 2018/0307859 A1 * | 10/2018 | LaFever | H04L 63/20 |
| 2019/0068627 A1 * | 2/2019 | Thampy | H04L 63/1425 |
| 2019/0158666 A1 * | 5/2019 | St-Cyr | G06Q 30/01 |

(Continued)

*Primary Examiner* — William D Titcomb
(74) *Attorney, Agent, or Firm* — Van Pelt, Yi & James LLP

(57) ABSTRACT

A system includes an interface and a processor. The interface is configured to receive a request to access shared services; provide a user interface for selecting a shared service of the shared services; and receive a selection of the shared service of the shared services. The processor is configured to determine data associated with the shared service of the shared services; store a shared-service tag indicating the data is associated with the shared service of the shared services and an identifier tag indicating the data is associated with a source; transfer the data to a model development system; determine a model using the data transferred to the model development system; and store the model.

24 Claims, 14 Drawing Sheets

(56) References Cited

U.S. PATENT DOCUMENTS

2019/0235705 A1\* 8/2019 Machesney ........... G06F 3/0483
2019/0266352 A1\* 8/2019 Gkoulalas-Divanis ......................
                                                            G06F 21/6254
2019/0370495 A1\* 12/2019 Chen ................... G06F 21/6254

\* cited by examiner

Model Building Data 600

| | Deidentified Tag | Identifiable Tag |
|---|---|---|
| 602 Data Item | ☒ | ☐ |
| 604 Data Item | ☒ | ☐ |
| 606 Data Item | ☒ | ☐ |
| 608 Data Item | ☐ | ☒ |
| 610 Data Item | ☒ | ☐ |
| 612 Data Item | ☐ | ☐ |
| 614 Data Item | ☒ | ☐ |
| 616 Data Item | ☐ | ☒ |

Skills Cloud Service Terms

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Agree To Terms — 902

Close Window — 904

Fig. 9

TENANT SECURITY CONTROL OF DATA FOR APPLICATION SERVICES

CROSS REFERENCE TO OTHER APPLICATIONS

This application is a continuation of U.S. patent application Ser. No. 16/253,052, now U.S. Pat. No. 11,782,749, entitled TENANT SECURITY CONTROL OF DATA FOR APPLICATION SERVICES filed Jan. 21, 2019 which is incorporated herein by reference for all purposes.

BACKGROUND OF THE INVENTION

Tenanted database systems store data for a plurality of tenants. Typically data for a tenant is stored in a tenanted database region isolated from other tenanted database regions associated with other tenants. The tenanted database system provider is prevented from directly accessing data stored in a tenanted database region or storing tenant data in any location other than the tenant associated tenanted database region, based on contractual commitments designed to protect the privacy of the tenant. However, there are applications wherein the owner of the data in the tenanted database system would like to provide revocable instructions to the tenanted database provider to provide additional functionality enabling the data owner to make better use of their data that would not be available under the existing contractual commitments but do not inherently risk the tenant privacy. For example, the tenanted database system provider may desire to build a machine learning model based on data of the same type from a group of tenants. Data from any single tenant may not be sufficient to create a machine learning model of high quality. This creates a problem wherein the tenanted database system provider would like to combine tenant data but cannot risk tenant privacy.

BRIEF DESCRIPTION OF THE DRAWINGS

Various embodiments of the invention are disclosed in the following detailed description and the accompanying drawings.

FIG. 6 is a block diagram illustrating an embodiment of model building data.

FIG. 9 is a block diagram illustrating an embodiment of a terms window for a shared service.

DETAILED DESCRIPTION

Figure 1:
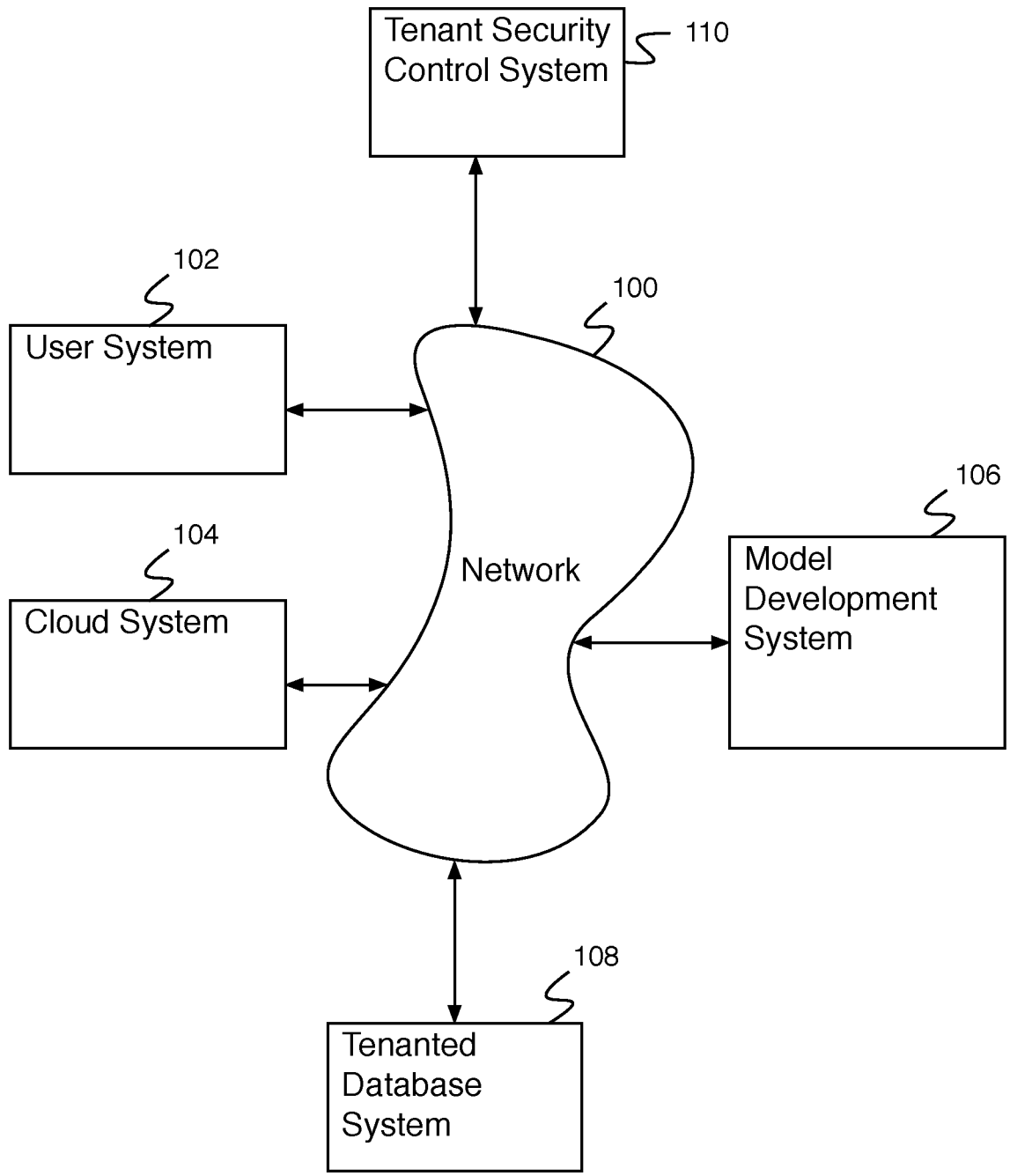
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for tenant security control comprises an interface configured to receive a request to access shared services, provide a user interface for receiving a selection of a shared service of the shared services, and receive the selection of the shared service of the shared services. The system for tenant security control additionally comprises a processor configured to determine data associated with the shared service of the shared services, store a shared-service tag indicating the data is associated with the shared service of the shared services and a tenant identifier tag indicating the data is associated with a contributing tenant, transfer the data to a model development system, determine a model using the data transferred to the model development system, and store the model. The system for tenant security control additionally comprises a memory coupled to the processor and configured to provide the processor with instructions.

A tenanted data storage system is configured to create a shared service based on data from a plurality of tenants. The shared service benefits each tenant that agrees to make its data available. For example, a shared service comprises a machine learning model (e.g., a machine learning model used for optical character recognition of supplier invoices). Each tenant only possesses a limited data set (e.g., the invoices they have received) and so a machine learning model based on those invoices will inherently be of limited quality. A much higher quality model can be built by combining the data of a group of tenants. An incentive can be given to each tenant of the group of tenants to contribute their data to the creation of the model by only allowing access to the model to those tenants that contribute. However, combining data needs to be done with express instructions from each contributing tenant, in a way that preserves the privacy of each contributing tenant, and giving each contributing tenant the option of opting out at a later point in time. A tenant opts in to contribute its data to a shared service by indicating intent to access shared services, receiving a user interface indication providing the option to opt in to one or more of a set of shared services, and providing an indication to opt in to one of the shared services. In some use cases, opting in can include a limited opt in, such as an opt in with technical limitations (e.g., only a subset of data would be shared, such as data relating only to users in one geographic region or a subset of data to exclude one or more specific data item types based on the data owner's choice). The tenant data storage system then determines tenant data associated with the shared service, marks the data as associated with the shared service by storing a shared-service tag associated with the data, marks the data as associated with the contributing tenant by storing a tenant identifier tag associated with the data, and transfers the data (or a copy of the data in the tenant database) to a model development system. For some shared services, the tenant may also be given the ability to select a subset of data to be shared (e.g., excluding select data item types or data associated with one or more specific geographic areas). The model development system builds the model based on the data (e.g., and on other previously stored data from other sources and tenants) and stores the model. For example, the model development system then provides the model for access to each tenant that contributed data to the creation of the model. When data is transferred to the model development system it may be preprocessed (e.g., filtered, aggregated, or deidentified). The model development system only stores data that has been indicated as opted in to the shared service and when possible the model development system stores data that has been deidentified. In response to a tenant determining to opt out of a shared service, any data associated with the shared service and that tenant that is not deidentified is deleted from the model development system. The system for tenant security control improves the computer by securely combining data for shared services, allowing higher quality models to be built than would be possible without combining the data.

Models (e.g., machine learning models, artificial intelligence models) can be improved with access to data sets that are normally inaccessible due to technology and legal contracts. The system for tenant security control implements a streamlined process that allows users to opt into a service if they agree to certain policy or contract changes that will allow access to the service and will allow tenant data sets to be transferred for use in model training. The system for tenant security control is able to securely transfer the data from the tenanted production system to the model development system, provide audit capabilities on who enabled the service and when, and to enable easy opt-out in the event the tenant decides to no longer share their data.

FIG. 1 is a block diagram illustrating an embodiment of a network system. In some embodiments, the network system of FIG. 1 comprises a network system for a system for tenant security control. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, cloud system 104, model development system 106, tenanted database system 108, and tenant security control system 110 communicate via network 100.

User system 102 comprises a user system for use by a user. For example, a user using user system 102 is associated with a tenant, e.g., an organization client of tenanted database system 108. User system 102 stores and/or accesses data on tenanted database system 108, e.g., within a tenanted data storage region. A user uses user system 102 to interact with tenanted database system 108, for example to store database data, to request database data, to create a report based on database data, to create a document, to access a document, to execute a database application, etc. Cloud system 104 comprises a cloud system (e.g., a remote data storage system) for storing data accessible via network 100, for remotely executing applications, etc. Model development system 106 comprises a system for building a model (e.g., an artificial intelligence model, a machine learning model, a neural network model, etc.) based on data. Model development system 106 creates models for shared services. For example, data is transferred from tenanted database system 108 to model development system 106 (e.g., in response to a customer opt-in to a shared system associated with the data) for model building. Tenanted database system 108 comprises a database system for storing data associated with one or more tenants. For example, data stored by tenanted database system 108 is stored in one of a plurality of tenant storage regions of tenanted database system 108. Tenant security control system 110 comprises a system for controlling security of tenant data and providing data to model development system 106 for creation of models for shared services.

For example, tenant security control system comprises a system for receiving a request to access shared services, providing a user interface for opting in to, conditionally in to, or out of the shared services, receiving a selection of a shared service of the shared services, determining data associated with the shared service of the shared services, storing a shared-service tag indicating the data is associated with the shared service and a tenant identifier tag indicating that the data is associated with the contributing tenant, transferring the data (or a copy thereof) to a model development system, determining a model using the data transferred to the model development system, and storing the model.

Figure 2:
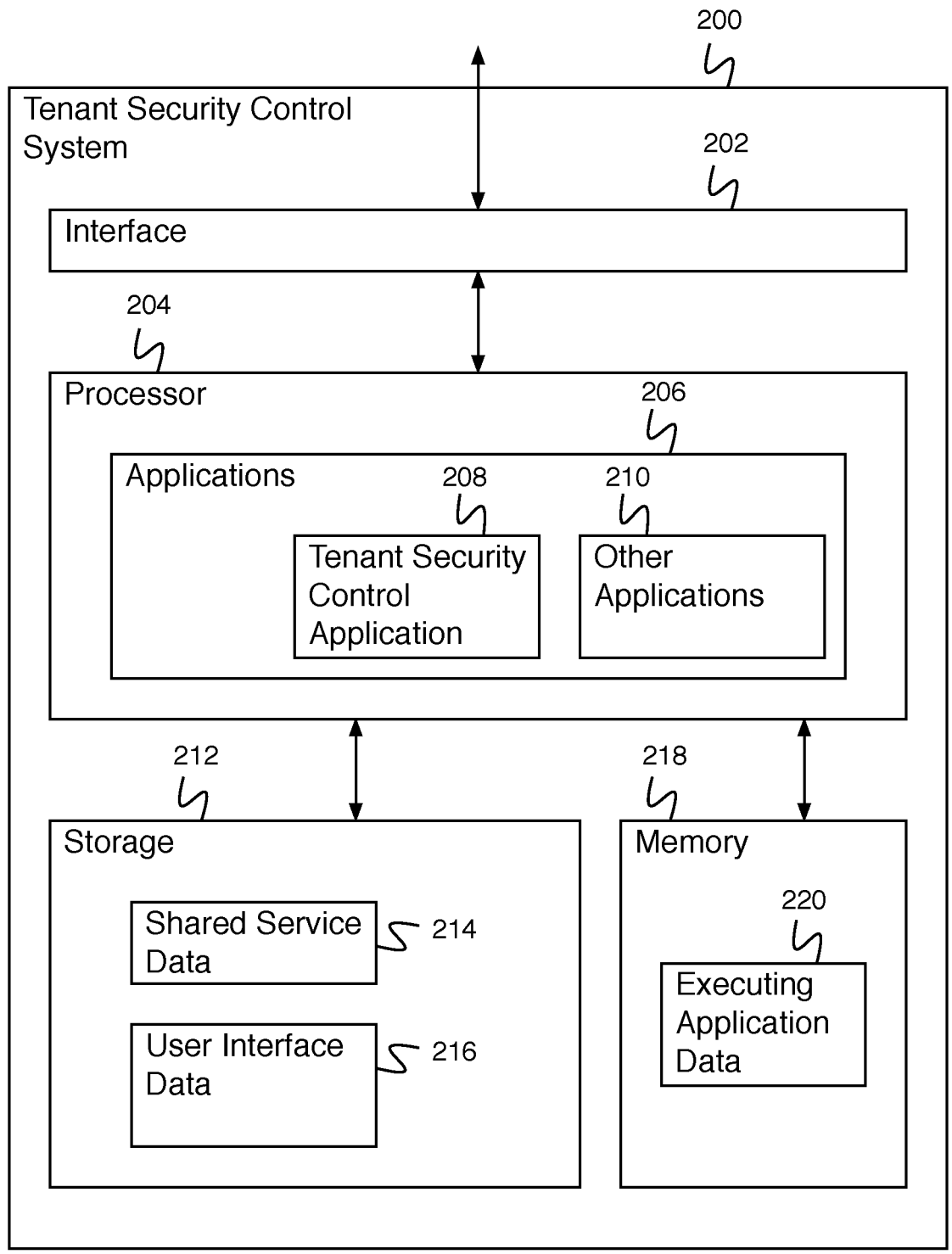
FIG. 2 is a block diagram illustrating an embodiment of a tenant security control system.

FIG. 2 is a block diagram illustrating an embodiment of a tenant security control system. In some embodiments, tenant security control system 200 of FIG. 2 comprises tenant security control system 110 of FIG. 1. In the example shown, tenant security control system 200 comprises interface 202. Interface 202 comprises an interface for communicating with external systems using a network. For example, interface 202 comprises an interface for communicating with a user system (e.g., for receiving a request to access shared services, for providing a user interface, for receiving a selection of a shared service, etc.). Processor 204 comprises a processor for executing applications 206. Applications 206 comprises tenant security control application 208 and other applications 210. For example, tenant security control application 208 receives a request to access shared services, provides a user interface for selecting a shared service, opting in to, conditionally in to, or out of the shared services, receives a selection of a shared service of the shared services, determines data associated with the shared service of the shared services, stores a shared-service tag indicating the data is associated with the shared service and a tenant identifier tag indicating that the data is associated with the contributing tenant, transfers the data (or a data copy) to a model development system, determines a model using the data transferred to the model development system, and stores the model. Other applications 210 comprises any other appropriate applications (e.g., a communications application, a chat application, a web browser application, a document preparation application, a data storage and retrieval application, a user interface application, a data analysis application, etc.). Tenant security control system 200 additionally comprises storage 212. Storage 212 comprises shared service data 214 (e.g., comprising data describing available shared services and associated shared service data) and user interface data 216 (e.g., for providing a user interface to a user). Tenant security control system 200 additionally comprises memory 218. Memory 218 comprises executing application data 220 comprising data associated with applications 206.

Figure 3:
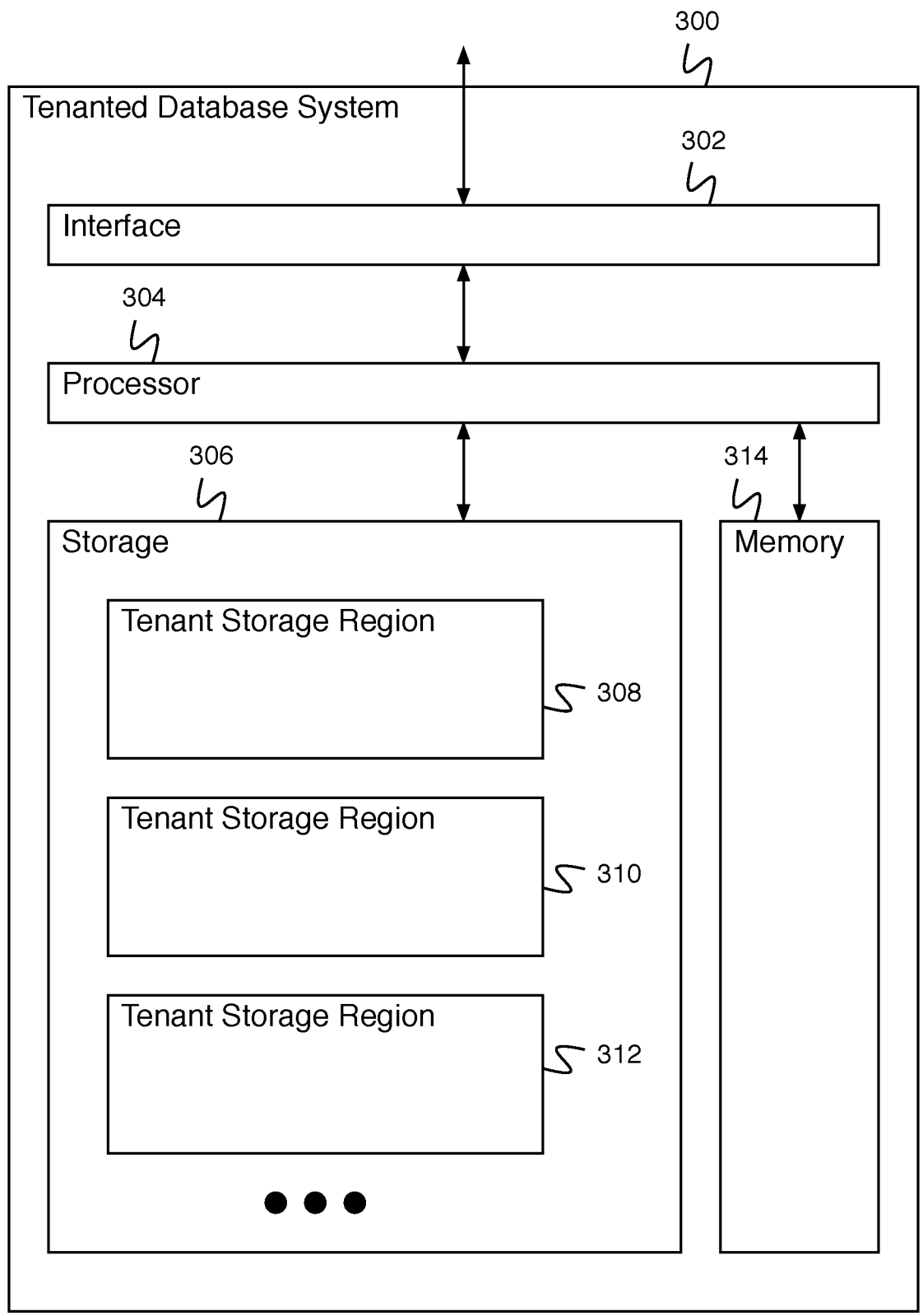
FIG. 3 is a block diagram illustrating an embodiment of a tenanted database system.

FIG. 3 is a block diagram illustrating an embodiment of a tenanted database system. In some embodiments, tenanted database system 300 of FIG. 3 comprises tenanted database system 108 of FIG. 1. In the example shown, tenanted database system 300 comprises interface 302. Interface 302 comprises an interface for communicating with external systems using a network. Processor 304 comprises a processor for executing applications (e.g., applications for storing tenant data, retrieving tenant data, preparing reports using tenant data, etc.). Storage 306 comprises a data storage for storing tenant data. Storage 306 comprises tenant storage region 308, tenant storage region 310, and tenant storage region 312. For example, storage 306 comprises any appropriate number of separate tenant storage regions. Each tenant storage region of storage 306 is associated with a different tenant. Data associated with a tenant is stored in the tenant storage region associated with that tenant. Memory 314 comprises executing application data.

Figure 4:
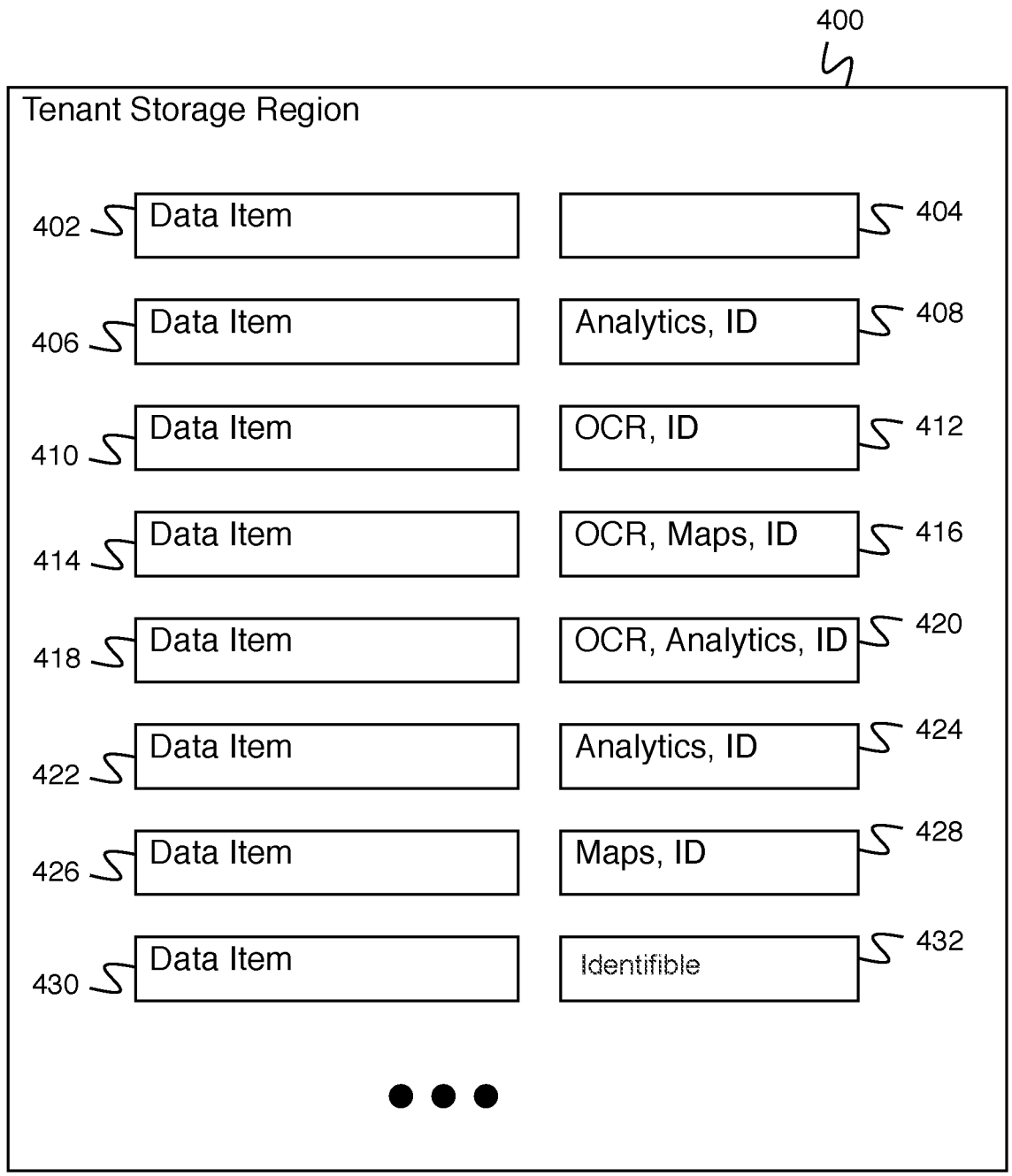
FIG. 4 is a block diagram illustrating an embodiment of tenanted data stored in a tenant storage region.

FIG. 4 is a block diagram illustrating an embodiment of tenanted data stored in a tenant storage region. In some embodiments, tenant storage region 400 comprises a tenant storage region of storage 306 of FIG. 3 (e.g., tenant storage region 308 of FIG. 3, tenant storage region 310 of FIG. 3, or tenant storage region 312 of FIG. 3). In the example shown, tenant storage region 400 comprises a set of data items stored by the tenant. Each data item is associated with any appropriate number of tags (e.g., no shared service tags, one shared service tag, multiple shared service tags, ID tag, identifiable tag, deidentifiable tag, etc.). Shared service tags indicate a shared service that has be opted into by the tenant associated with the data item. Data item 402 is associated with tags 404 comprising no tags; data item 406 is associated with tags 408 comprising a shared service tag (e.g., an analytics tag) and an ID tag; data item 410 is associated with tags 412 comprising a shared service tag (e.g., an OCR (optical character recognition) tag) and an ID tag; data item 414 is associated with tags 416 comprising shared service tags (e.g., an OCR tag and a maps tag), and an ID tag; data item 418 is associated with tags 420 comprising shared service tags (e.g., an OCR tag and an analytics tag), and an ID tag; data item 422 is associated with tags 424 comprising a shared service tag (e.g., an analytics tag) and an ID tag; data item 426 is associated with tags 428 comprising a shared service tag (e.g., a maps tag) and an ID tag; and data item 430 is associated with tags 432 comprising an identifiable tag.

Figure 5:
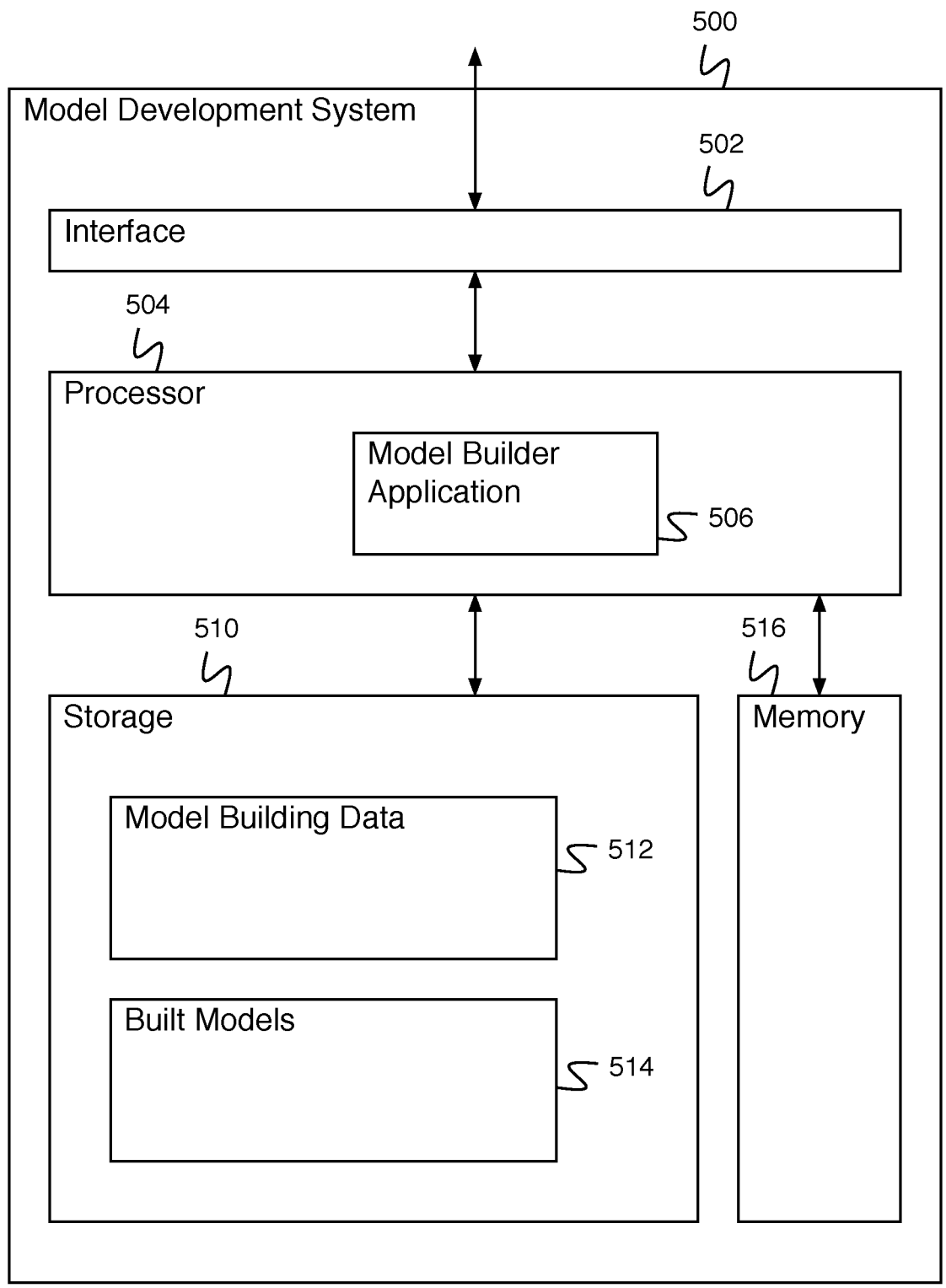
FIG. 5 is a block diagram illustrating an embodiment of a model development system.

FIG. 5 is a block diagram illustrating an embodiment of a model development system. In some embodiments, model development system 500 of FIG. 5 comprises model development system 106 of FIG. 1. In the example shown, model development system 500 comprises interface 502. Interface 502 comprises an interface for communicating with external systems using a network (e.g., to receive data or a copy of database data, to receive an indication to create a model, to provide a model, etc.). Processor 504 comprises a processor for executing applications (e.g., for executing model builder application 506). Model builder application 506 comprises an application for building a model based on data (e.g., a machine learning model builder application, a neural network model builder application, etc.). Storage 510 comprises a data storage for storing data (e.g., model building data 512 and built models 514). Model building data 512 comprises data for building models. For example, model building data 512 comprises tenant data transferred from a tenanted database system to model development system 500. Built models 514 comprises models built from data. Memory 516 comprises executing application data.

FIG. 6 is a block diagram illustrating an embodiment of model building data. In some embodiments, model building data 600 comprises model building data 512 of FIG. 5. In the example shown, model building data 600 comprises a plurality of data items, each data item indicated to be associated or not associated with a deidentified tag and indicated to be associated or not associated with an identifiable tag. For example, a data item is associated with a deidentified tag in the event that the data has been processed using a deidentification process. A data item is associated with an identifiable tag in the event the data item is known to comprise identifiable data (e.g., in the event a process determines that the data item comprises identifiable data). A data item is associated with neither an identifiable tag nor a deidentified tag in the event it is neither known to be identifiable or deidentified. Data item 602 is associated with a deidentified tag and is not associated with an identifiable tag; data item 604 is associated with a deidentified tag and is not associated with an identifiable tag; data item 608 is not associated with a deidentified tag and is associated with an identifiable tag; data item 610 is associated with a deidentified tag and is not associated with an identifiable tag; data item 612 is associated with neither a deidentified tag nor an identifiable tag; data item 614 is associated with a deidentified tag and is not associated with an identifiable tag; and data item 616 is not associated with a deidentified tag and is associated with an identifiable tag.

Figure 7:
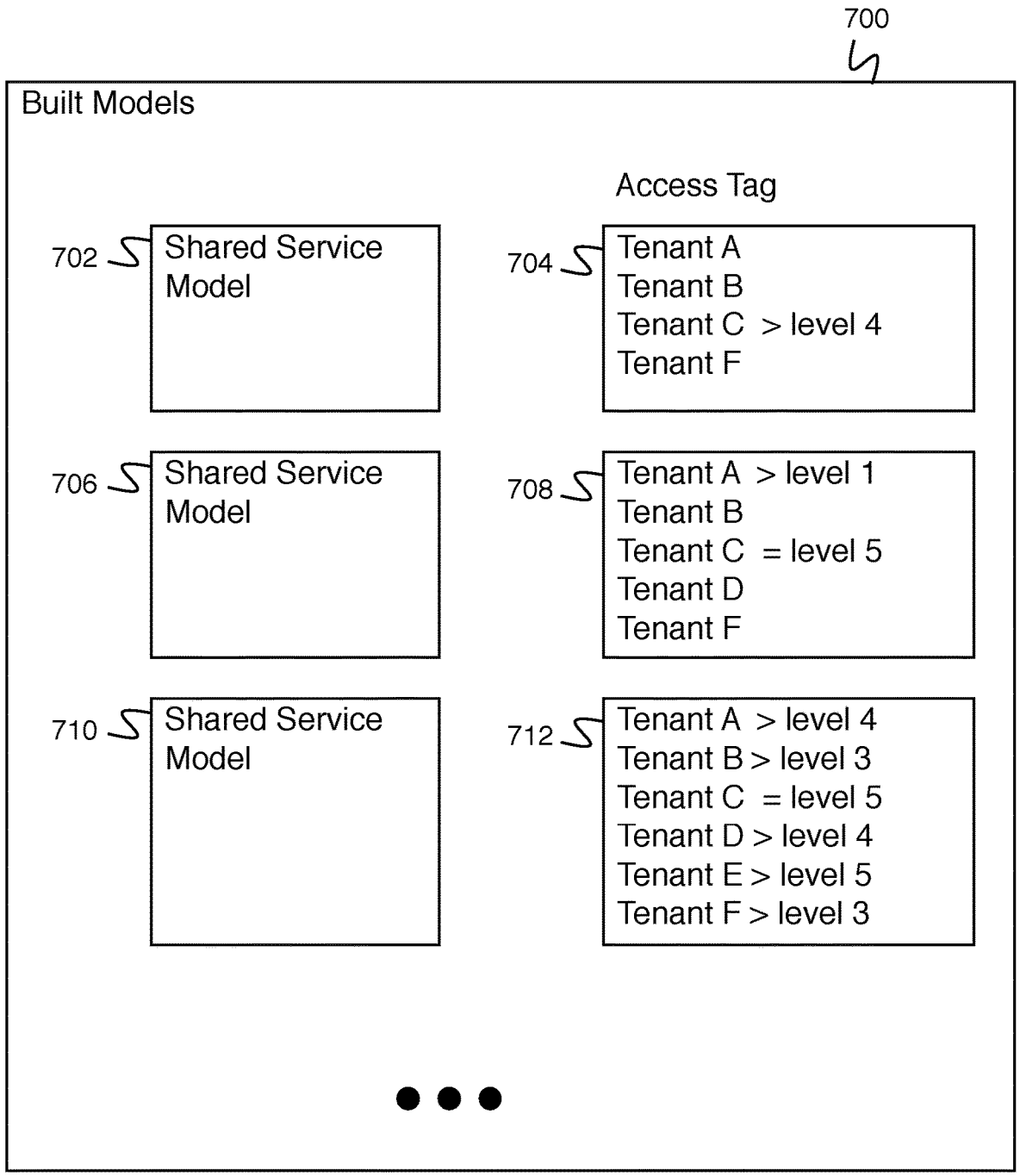
FIG. 7 is a block diagram illustrating an embodiment of built model storage.

FIG. 7 is a block diagram illustrating an embodiment of built model storage. In some embodiments, built models 700 comprises built models 514 of FIG. 5. In the example shown, built models 700 comprises shared service model 702 associated with access tags 704, shared service model 706 associated with access tags 708, and shared service model 710 associated with access tags 712. Each shared service model comprises a model associated with a shared service (e.g. a maps service, an analytics service, an OCR service, etc.). Access tags comprise a set of access tags indicating tenants and/or users associated with tenants that have access to the associated shared service model. Access tags 704 indicate that shared service model 702 is accessible to tenant A, to tenant B, to users of tenant C greater than level 4, and to tenant F. Access tags 708 indicate that shared service model 706 is accessible to users of tenant A greater than level 1, to tenant B, to users of tenant C equal to level 5, to tenant D, and to tenant F. Access tags 712 indicate that shared service model 710 is accessible to users of tenant A greater than level 4, to users of tenant B greater than level 3, to users of tenant C equal to level 5, to users of tenant D greater than level 4, to users of tenant E greater than level 5, and to users of tenant F greater than level 3.

Figure 8:
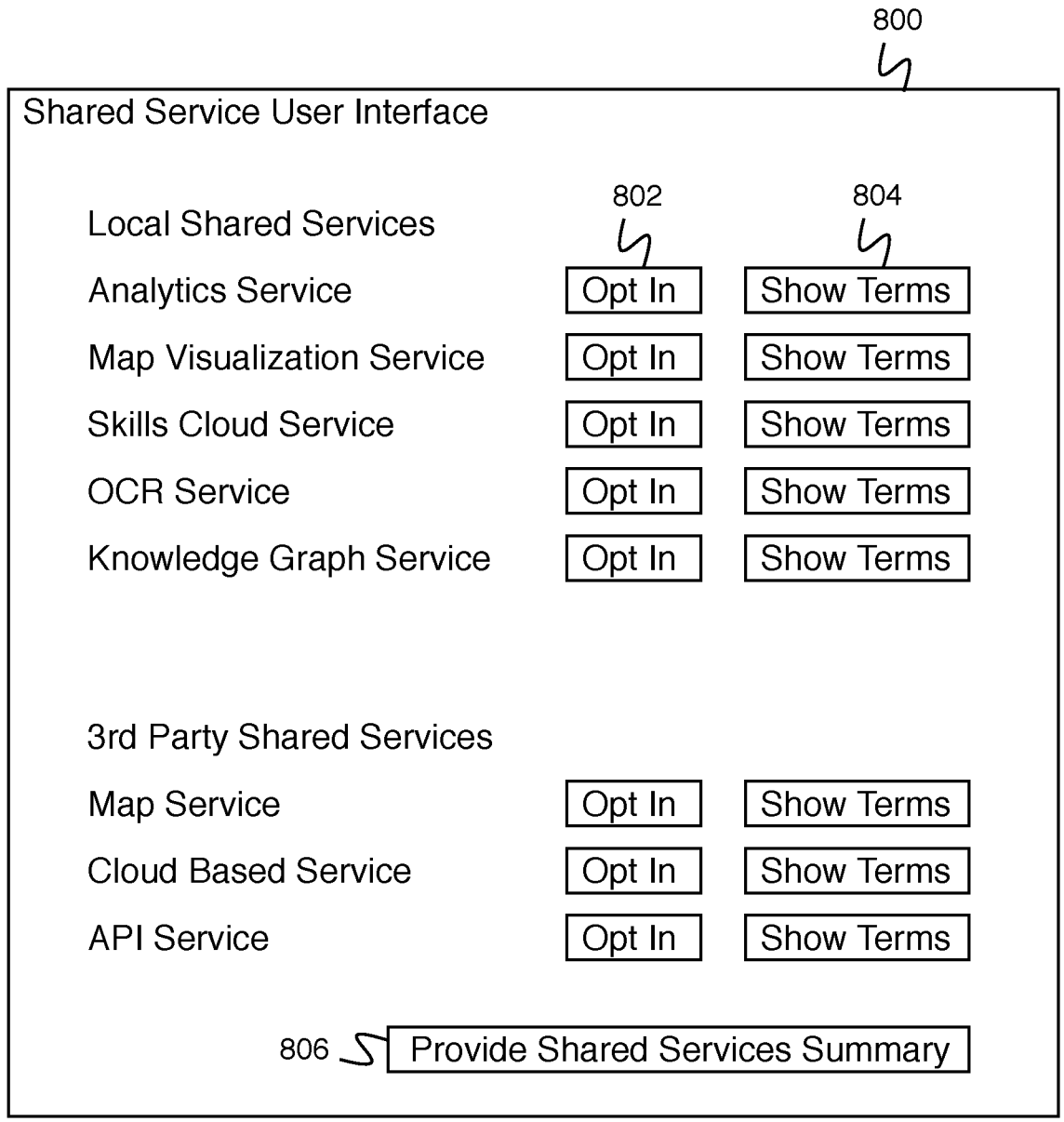
FIG. 8 is a block diagram illustrating an embodiment of a shared service user interface.

FIG. 8 is a block diagram illustrating an embodiment of a shared service user interface. In some embodiments, the user interface of FIG. 1 comprises a user interface for opting in to a shared service. In some embodiments, the user interface of FIG. 1 is provided by tenant security control system 110 of FIG. 1. In the example shown, shared service user interface 800 comprises a list of shared services, comprising local shared services (e.g., shared services executed by a tenanted database system) and $3^{rd}$ party shared services (e.g., shared services executed by a $3^{rd}$ party system, e.g., an external system or a cloud system). For example, shared service user interface 800 indicates local services including an analytics service, a map visualization service, an OCR service (e.g., a service for performing optical character recognition on business documents, e.g., receipts, invoices, etc.), and a knowledge graph service, and $3^{rd}$ party services comprising a map service (e.g., a third party service for mapping), a cloud based service (e.g., a third party service hosted on a cloud system), and an API (e.g., application programming interface) service (e.g., a third part service accessible via an API). In various embodiments, there are three types of shared services: local services (runs in a company tenant system); third party ones (third party system run by a third party but being connected to the system), extensions (run by the company but outside of the tenant system), or any other appropriate combination of some or all of these services. Each listed service is associated with an Opt In button (e.g., Opt In button 802, e.g., for indicating to opt in to the shared service) and a Show Terms button (e.g., Show Terms button 804, e.g., for indicating to show terms associated with opting in to the shared service). In various embodiments, a conditional opt in button is displayed or an opt out button is displayed. In various embodiments, an opting out indication comprises deselecting opt in button 802 or deselecting a conditional opt in button. Shared service user interface 800 additionally comprises provide shared services summary button 806. For example, the tenant security control system is configured to provide a shared services summary in response to a user indication to provide shared services summary button 806. For example, a shared services summary comprises a summary indicating opted-in shared services, available models associated with shared services, data transferred for shared services, whether data transferred for shared services was deidentified, etc.

FIG. 9 is a block diagram illustrating an embodiment of a terms window for a shared service. Skills cloud service terms window 900 comprises a description of terms associated with a shared service (e.g., with a skills cloud service), agree to terms button 902 (e.g., for agreeing to the skills cloud service terms) and close window button 904 (e.g., for closing window 900 without agreeing to the terms).

Figure 10:
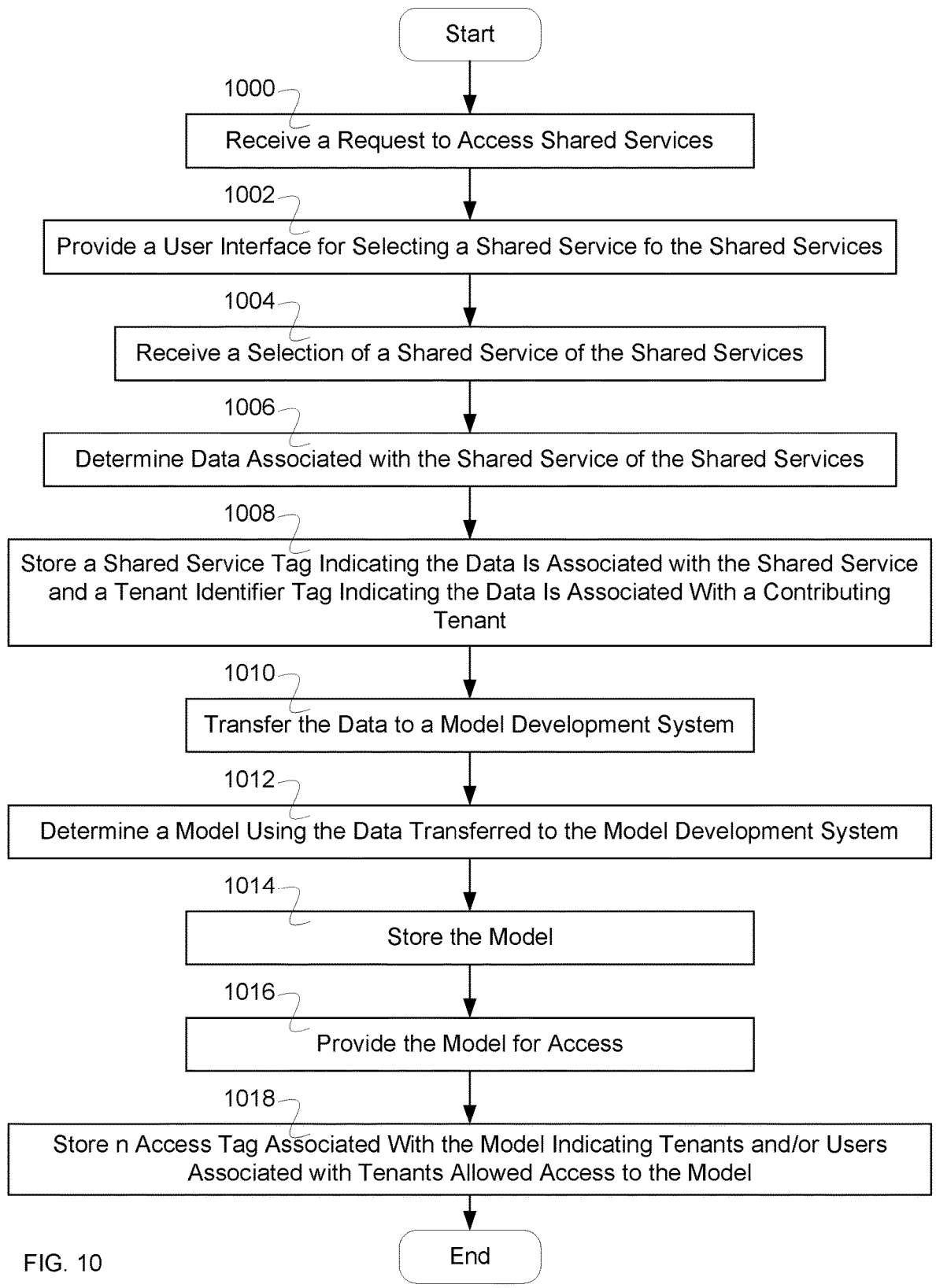
FIG. 10 is a flow diagram illustrating an embodiment of a process for tenant security control.

FIG. 10 is a flow diagram illustrating an embodiment of a process for tenant security control. In some embodiments, the process of FIG. 10 is executed by tenant security control system 110 of FIG. 1. In the example shown, in 1000, a request to access shared services is received. In 1002, a user interface is provided for selecting a shared service of the shared services. In 1004, a selection of a shared service of the shared services is received. In 1006, data associated with the shared service of the shared services is determined. In 1008, a shared-service tag indicating the data is associated with the shared service and a tenant identifier tag indicating the data is associated with a contributing tenant are stored. In 1010, the data is transferred to a model development system. In 1012, a model is determined using the data transferred to the model development system. For example, the model is determined using the data transferred to the model development system and other data (e.g., data associated with other tenants previously transferred to the model development system). The model comprises a production model (e.g., a model determined using an established model determination algorithm, available for immediate use by users) or a development model (e.g., a model determined using an experimental model determination algorithm, available for users or administrators to test). In 1014, the model is stored. In 1016, the model is provided for access. For example, the model is provided for access to all users that have opted in to the shared service. In 1018, an access tag is stored associated with the model indicating tenants and/or users associated with tenants allowed access to the model.

Figure 11:
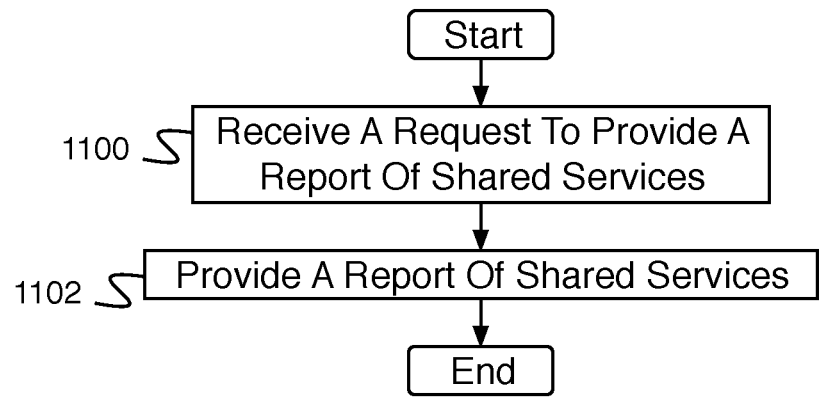
FIG. 11 is a flow diagram illustrating an embodiment of a process for providing a report of shared services.

FIG. 11 is a flow diagram illustrating an embodiment of a process for providing a report of shared services. In some embodiments, the process of FIG. 11 is executed by tenant security control system 110 of FIG. 1. In the example shown, in 1100, a request to provide a report of shared services is received. In 1102, a report of shared services is provided. For example, a report of shared services comprises a list of opted-in shared services, an opt-in date for opted-in shared services, a user opting in to the shared services, a list of data associated with shared services, a list of models associated with shared services, an audit trail of access to shared services, etc.

Figure 12:
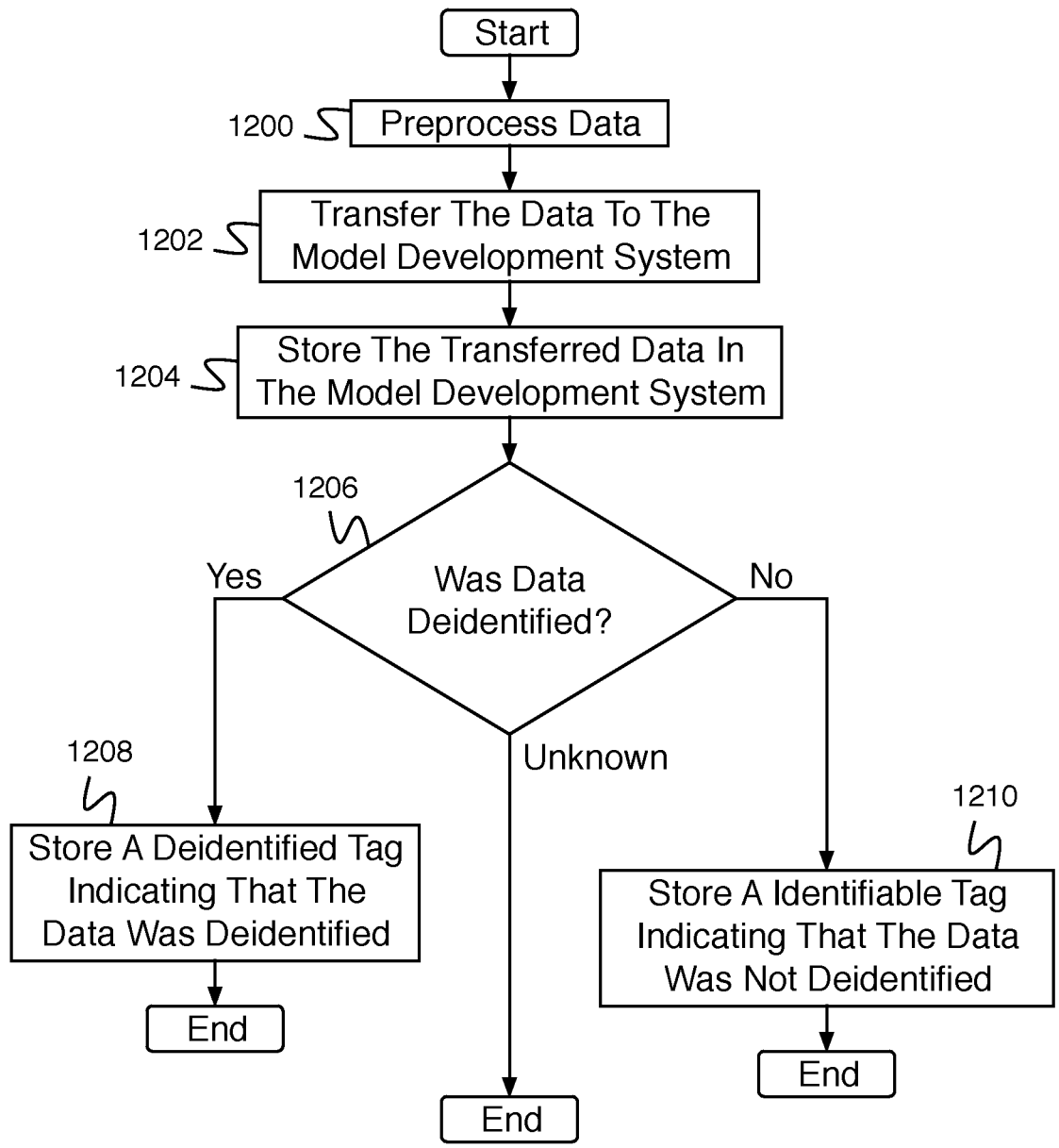
FIG. 12 is a flow diagram illustrating an embodiment of a process for transferring data.

FIG. 12 is a flow diagram illustrating an embodiment of a process for transferring data. In some embodiments, the process of FIG. 12 implements 1010 of FIG. 10. In the example shown, in 1200, data is preprocessed. For example, data preprocessing comprises filtering data, aggregating data, or deidentifying data. In 1202, the data is transferred to the model development system. In 1204, the transferred data is stored in the model development system. In 1206, it is determined whether the data was deidentified. In the event it is determined that the data was deidentified, control passes to 1208. In 1208, a deidentified tag is stored indicating that the data was deidentified, and the process ends. In the event it is determined in 1206 that the data was not deidentified, control passes to 1210. In 1210, an identifiable tag is stored indicating that the data was not deidentified, and the process ends. In the event it is determined in 1206 that it is not known whether the data was deidentified, the process ends (e.g., neither a deidentified tag nor an identifiable tag is stored).

Figure 13:
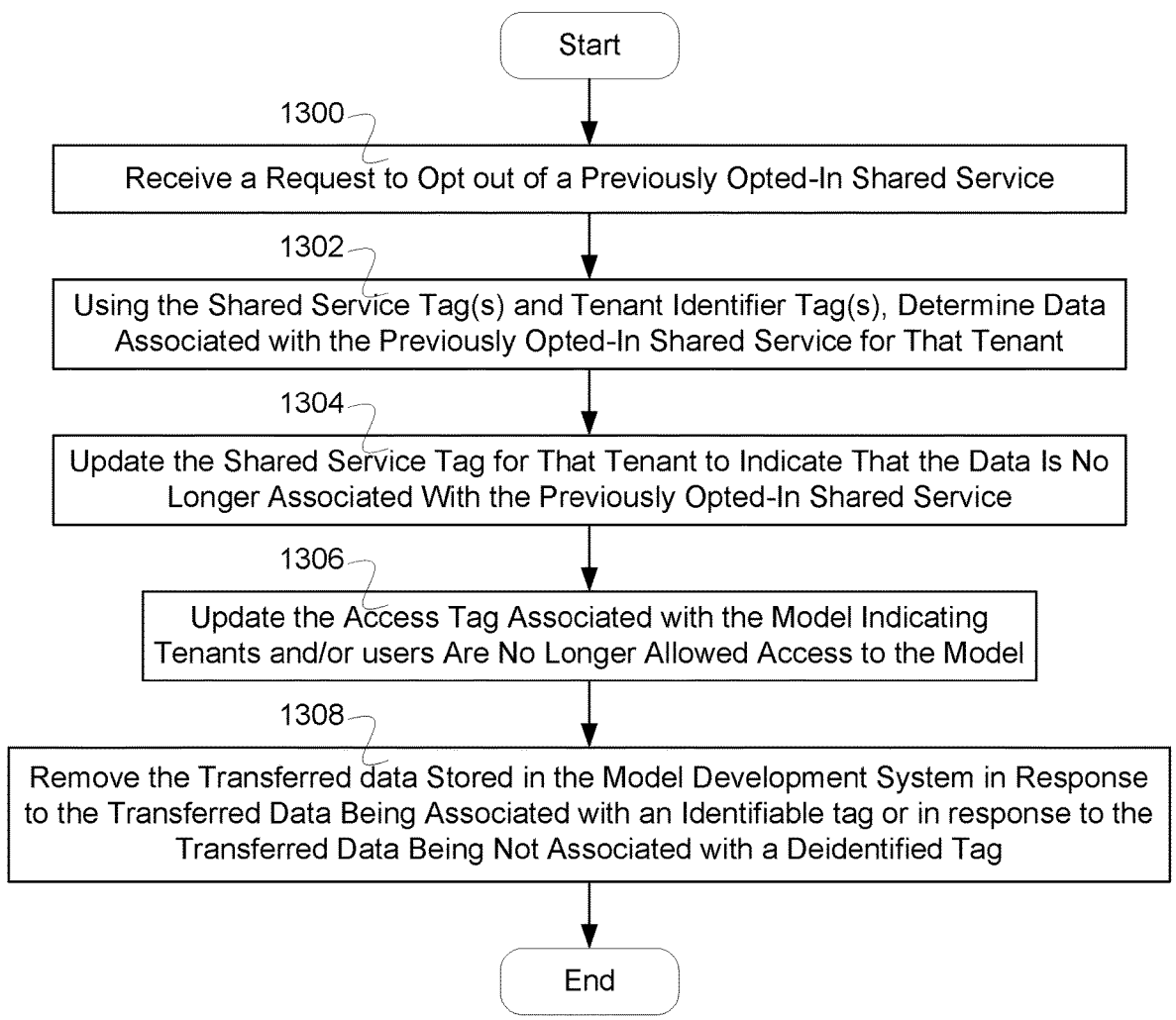
FIG. 13 is a flow diagram illustrating an embodiment of a process for opting out of a shared service.

FIG. 13 is a flow diagram illustrating an embodiment of a process for opting out of a shared service. In some embodiments, the process of FIG. 13 is executed by tenant security control system 110 of FIG. 1. In the example shown, in 1300, a request is received to opt out of a previously opted-in shared service. In 1302, data associated with the previously opted-in shared service for that tenant is determined using the shared service tag(s) and tenant identifier tag(s). In 1304, the shared service tag for that tenant is updated to indicate that the data is no longer associated with the previously opted-in shared service. In 1306, the access tag associated with the model is updated indicating tenants and/or users are no longer allowed access to the model. In 1308, the transferred data stored in the model development system is removed in response to the transferred data being associated with an identifiable tag or in response to the transferred data not being associated with a deidentified tag.

Figure 14:
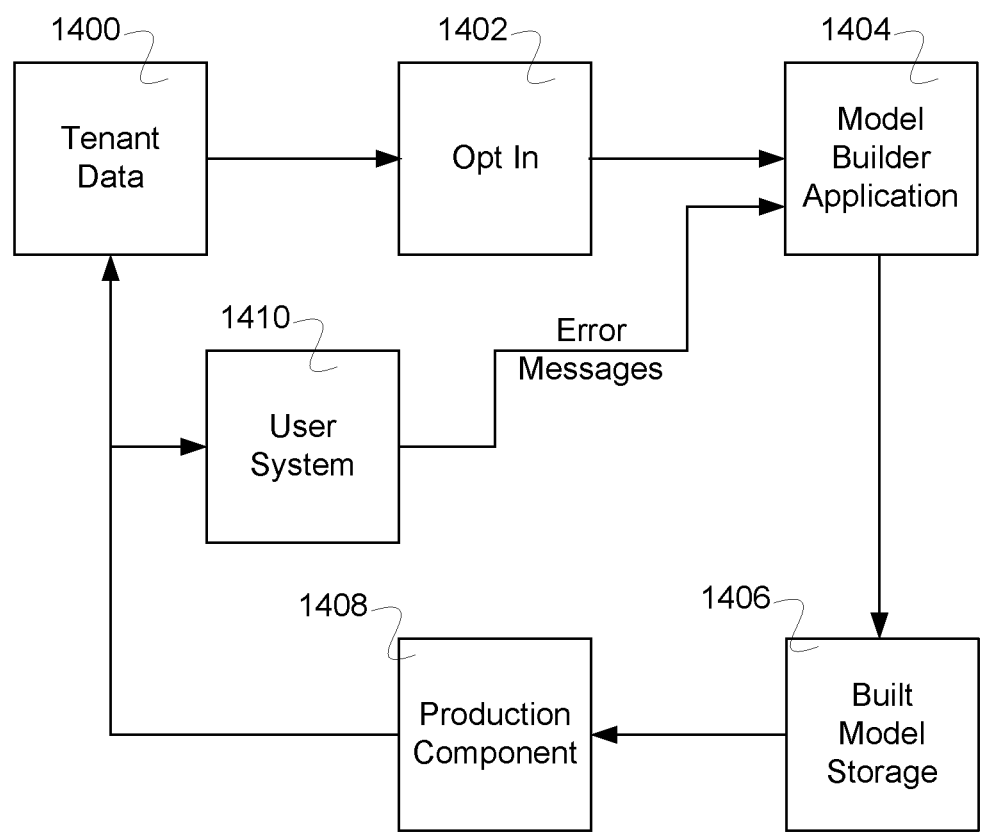
FIG. 14 is a block diagram illustrating an embodiment of a feedback process.

FIG. 14 is a block diagram illustrating an embodiment of a feedback process. In some embodiments, model builder application 1404 of FIG. 14 is the same as model builder application 506 of FIG. 5. In the example shown, tenant data 1400 is processed by Opt In 1402 and a portion or all of tenant data stored in tenant data 1400 is provided for building models. Model builder application 1404 receives opted in data and uses the data to generate a model (e.g., the data is used to train a machine learning model). The generated model is stored in built model storage 1406. The model is run in production as production component 1408. Production component 1408 creates new data that is provided and stored as tenant data 1400 when a tenant user uses the production model of production component 1408. In addition, a user receiving output data from production component 1408 will indicate errors in the model by correcting the output data which is then saved with the tenant data and these messages (the corrected data elements) are provided to model builder application 1404 to improve the built model.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    an interface configured to:
       receive a request to access shared services;
       provide a user interface for opting-in to a shared service of the shared services; and
       receive a selection of the shared service of the shared services and a selection of a subset of a set of tenant data to be shared with the shared services;
    a processor configured to:
       determine whether tenant data of the set of tenant data is included in the subset of tenant data;
       in response to a determination the tenant data is included in the subset of the tenant data:
          store a shared-service tag indicating the tenant data is associated with the shared service of the shared services; and
          store an identifier tag indicating the tenant data is associated with a tenant;
       transfer the tenant data to a model development system;
       determine a model using the tenant data transferred to the model development system and other data transferred to the model development system from other tenants opting-in to the shared service; and
       store the model.

2. The system of claim 1, wherein the selection comprises one or more of opting in, opting out, or conditionally opting in to the shared service of the shared service.

3. The system of claim 1, wherein in response to the selection comprising opting out of a previously opted in shared service, the processor is further configured to:
    using the shared-service tag, determine data associated with the previously opted-in shared service; and
    update the shared-service tag to indicate that the data is no longer associated with the previously opted-in shared service.

4. The system of claim 3, wherein the processor is further configured to update the access tag associated with the model indicating tenants and/or users are no longer allowed access to the model.

5. The system of claim 1, wherein the processor is further configured to remove the transferred tenant data stored in the model development system in response to the transferred tenant data being associated with an identifiable tag or in response to the transferred tenant data being not associated with a deidentified tag.

6. The system of claim 1, wherein the user interface shows terms for one or more of opting in, opting out, or conditionally opting in to the shared service of the shared service.

7. The system of claim 6, wherein the user interface enables agreeing to the terms for opting in, opting out, or conditionally opting in.

8. The system of claim 1, wherein the shared service of the shared services comprises at least one or more of an analytics service, a map visualization service, a skills cloud service, an optical character recognition service, a knowledge graph service, a third party service, a map service, and/or a cloud based service.

9. The system of claim 1, wherein the interface is further configured to provide a shared services summary.

10. The system of claim 1, wherein the interface is further configured to:
    receive a request to provide a report of the shared services; and
    provide the report of the shared services.

11. The system of claim 10, wherein the report of the shared services comprises an audit trail.

12. The system of claim 1, wherein transferring the tenant data comprises preprocessing the tenant data.

13. The system of claim 12, wherein preprocessing the tenant data comprises one or more of the following: deidentifying the tenant data, filtering the tenant data, and aggregating the tenant data.

14. The system of claim 1, wherein the processor is further configured to store a deidentified tag indicating that the tenant data was deidentified.

15. The system of claim 1, wherein the processor is further configured to store an identifiable tag indicating that the tenant data was not deidentified.

16. The system of claim 1, wherein the processor is further configured to store the transferred tenant data in the model development system.

17. The system of claim 1, wherein the model comprises a development model.

18. The system of claim 1, wherein the model comprises a production model.

19. The system of claim 1, wherein the processor is further configured to provide the model for access.

20. The system of claim 1, wherein the processor is further configured to provide the model for access to sources that have opted in to the shared service of the shared services.

21. The system of claim 1, wherein the processor is further configured to store an access tag associated with the model indicating sources and/or users associated with sources allowed access to the model.

22. The system of claim 1, wherein the interface is further configured to provide a user interface for exceptions to the data associated with the shared service of the shared services.

23. A method, comprising:
    receiving a request to access shared services;
    providing a user interface for opting-in to a shared service of the shared services;
    receiving a selection of the shared service of the shared services and a selection of a subset of a set of tenant data to be shared with the shared services;
    determining, using a processor, whether tenant data of the set of tenant data is included in the subset of tenant data;

in response to a determination the tenant data is included in the subset of the tenant data:
    storing a shared-service tag indicating the tenant data is associated with the shared service of the shared services; and
    storing an identifier tag indicating the tenant data is associated with the tenant;
transferring the tenant data to a model development system;
determining a model using the tenant data transferred to the model development system and other data transferred to the model development system from other tenants opting-in to the shared service; and
storing the model.

24. A computer program product, the computer program product being embodied in a non-transitory computer readable storage medium and comprising computer instructions for:
    receiving a request to access shared services;
    providing a user interface for opting-in to a shared service of the shared services;
    receiving a selection of the shared service of the shared services and a selection of a subset of a set of tenant data to be shared with the shared services;
    determining whether tenant data of the set of tenant data is included in the subset of tenant data;
    in response to a determination the tenant data is included in the subset of the tenant data:
        storing a shared-service tag indicating the tenant data is associated with the shared service of the shared services; and
        storing an identifier tag indicating the tenant data is associated with the tenant;
    transferring the tenant data to a model development system;
    determining a model using the tenant data transferred to the model development system and other data transferred to the model development system from other tenants opting-in to the shared service; and
    storing the model.

* * * * *